2,860,118

CORROSION PREVENTING COATING COMPOSITIONS FOR METALS COMPRISING A CHLORINE CONTAINING ORGANIC POLYMER AS FILM FORMER, A COPPER COMPOUND AND A TERTIARY ORGANIC HETEROCYCLIC BASE

Rudolf Nagelschmidt, Hanau (Main), and Anton Rudolph, Gross Zimmern, Germany, assignors to Deutsche Gold- und Silber-Scheideanstalt vormals Roessler, Frankfurt am Main, Germany No Drawing. Application September 22, 1955
Serial No. 536,010

Claims priority, application Germany September 24, 1954

7 Claims. (Cl. 260—41)

The present invention relates to an improved anti-corrosion coating composition for metals.

The use of metal oxides as passivating agents in anti-corrosion paints for coating metals has already been proposed. It has further been proposed to incorporate various metal oxides, for example, pigments composed of metal oxides in combination with organic bases, in rust preventing paints.

According to the invention, it has ben found that an exceptionally good rust preventing action can be achieved by incorporating copper oxide or its hydrate and a tertiary heterocyclic organic base in paints and similar metal coating compositions. It was furthermore found that paints according to the invention were particularly effective when the binding agent therein completely or essentially consists of chlorine containing organic polymers and especially chlorinated rubber. Further examples of such chlorine containing binding agents are polychloroprene, chlorosulfonated polyethylene and vinylchloride containing mixed polymerizates, such as, a co-polymer produced from vinylchloride and vinyl-acetate.

Preferably copper oxide or its hydrate and the tertiary heterocyclic organic base are each employed in quantities of 0.5 to 15 parts by weight per 100 parts by weight of binding agent in the coating composition.

Tertiary heterocyclic organic bases which can be employed for the coating compositions according to the invention, for example, are as follows: pyridine, quinoline, picoline, their substitution products, and commercial pyridine base mixtures.

When the coating compositions according to the invention are to serve as primary coats, it has also been found advantageous to incorporate finely divided metal or metalloid oxides in such compositions, as they increase the bond with further coatings applied thereover. Preferably oxides are employed which are obtained by the vapor phase oxidation or hydrolysis of volatile metal or metalloid compounds whereby the corresponding oxides are produced as aerosols which subsequently are agglomerated as aerogels. For example, a finely divided silicon dioxide can be obtained by burning silicon tetrachloride in a flame with a hydrogen containing fuel so that the silicon tetrachloride reacts in the vapor phase with the water vapor formed by the combination of the fuel to form a silica aerosol which upon cooling below 600° C. agglomerates to an aerogel. $Al_2O_3$ and $TiO_2$ aerogels containing finely divided elemental particles can be obtained in an analogous manner. The elemental particle size of such aerogels is generally below 50 m$\mu$. The quantity of such finely divided oxides incorporated in the coating compositions according to the invention can be 10 to 200 parts by weight per 100 parts by weight of binding agent.

While chlorine containing organic polymers are preferably employed as the binding agents (film formers) in the coating compositions according to the invention, other binding agents also can be used, such as, for example, linseed-oil, stand-oil, tung-oil and the like.

The protective passivating action of the coating compositions according to the invention containing copper oxide or its hydrate and a tertiary heterocyclic organic base is clearly illustrated by coating a non-acid resistant metal, such as, steel, with such compositions, damaging the coating, such as, by scratching, and applying acid to the damaged coating as the hydrogen liberation which immediately sets in ceases after a relatively short time and the acid attack upon the metal laid base comes to a standstill.

The following examples in which the proportions are given in parts by weight serve to illustrate several coating compositions according to the invention:

Example 1

| | Parts |
|---|---|
| Chlorinated rubber | 20.0 |
| Chloroparaffin | 7.0 |
| Cumarone-indene resin | 2.5 |
| Butyl acetate | 40.0 |
| Ethyl acetate | 13.0 |
| Benzine (B. P. 160–200° C.) | 10.0 |
| Light benzine (B. P. 60–95° C.) | 6.2 |
| Copper oxide | 0.5 |
| Pyridine | 0.8 |
| | 100.0 |

When the interior of an ordinary steel drum was coated with this composition, its resistance to corrosive liquids was substantially increased and such drum could be employed for storing hydrochloric acid.

Example 2

| | Parts |
|---|---|
| Chlorinated rubber | 19.5 |
| Neoprene (polychloroprene) | 6.5 |
| Dioctyl phthalate | 6.5 |
| Copper oxide | 0.7 |
| Quinoline | 0.8 |
| "Aerosil," a finely divided silica produced by the vapor phase hydrolysis of silicon tetrachloride with steam | 9.0 |
| Butyl acetate | 25.0 |
| Ethyl acetate | 12.0 |
| Benzine | 20.0 |
| | 100.0 |

The incorporation of the finely divided silica rendered this coating composition especially suited as a primer and further retarded sedimentation therein.

We claim:

1. A corrosion preventing coating composition for metals comprising a chlorine containing organic polymer selected from the group consisting of chlorinated rubber, polychloroprene, chlorosulfonated polyethylene and co-polymers of vinyl chloride and vinyl acetate as a film former, a copper compound selected from the group consisting of copper oxide and its hydrate and a tertiary organic heterocyclic base containing a six membered nitrogen containing heterocyclic ring selected from the group consisting of pyridine, picoline and quinoline.

2. A corrosion preventing coating composition for metals comprising chlorinated rubber as a film former, a copper compound selected from the group consisting of copper oxide and its hydrate and a tertiary organic heterocyclic base containing a six membered nitrogen containing heterocyclic ring selected from the group consisting of pyridine, picoline and quinoline.

3. A coating composition according to claim 1 in which the quantity of copper compound is 0.5 to 15 parts by weight and the quantity of tertiary heterocyclic organic base is 0.5 to 15 parts by weight per 100 parts by weight of film former.

4. A coating composition according to claim 1 in which in addition contains an additional finely divided oxide selected from the group consisting of silicon dioxide, titanium dioxide and aluminum oxide.

5. A coating composition according to claim 4 in which the quantity of finely divided oxide is 10 to 200 parts by weight per 100 parts by weight of film former.

6. A coating composition according to claim 1 which in addition contains a finely divided silicon dioxide having an elemental particle size of less than 50 m$\mu$.

7. A metallic article of manufacture having at least a portion of its surface protected against corrosion by a coating composition according to claim 1.

References Cited in the file of this patent

UNITED STATES PATENTS

| | | |
|---|---|---|
| 2,148,862 | Kern | Feb. 28, 1939 |
| 2,260,420 | Young | Oct. 28, 1941 |
| 2,387,323 | Gaynor et al. | Oct. 23, 1945 |
| 2,514,868 | Hubbell | July 11, 1950 |
| 2,579,610 | Pitre et al. | Dec. 25, 1951 |